April 3, 1945.   H. H. KEEN   2,372,900
ACTUATOR FOR ACCUMULATING MECHANISMS
Filed Sept. 22, 1939    8 Sheets-Sheet 1

INVENTOR
Harold H. Keen
BY
ATTORNEY

April 3, 1945. H. H. KEEN 2,372,900
ACTUATOR FOR ACCUMULATING MECHANISMS
Filed Sept. 22, 1939 8 Sheets-Sheet 2

INVENTOR
Harold H. Keen
BY
ATTORNEY

April 3, 1945.  H. H. KEEN  2,372,900
ACTUATOR FOR ACCUMULATING MECHANISMS
Filed Sept. 22, 1939  8 Sheets-Sheet 3

INVENTOR
Harold H. Keen
BY
ATTORNEY

April 3, 1945.  H. H. KEEN  2,372,900
ACTUATOR FOR ACCUMULATING MECHANISMS
Filed Sept. 22, 1939  8 Sheets-Sheet 4

INVENTOR
Harold H. Keen
BY
ATTORNEY

April 3, 1945.　　　　H. H. KEEN　　　　2,372,900
ACTUATOR FOR ACCUMULATING MECHANISMS
Filed Sept. 22, 1939　　　8 Sheets-Sheet 5
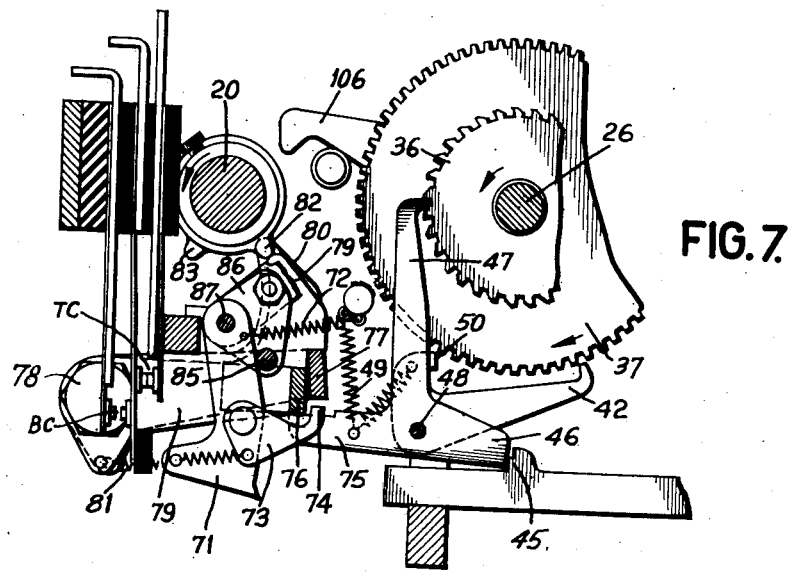
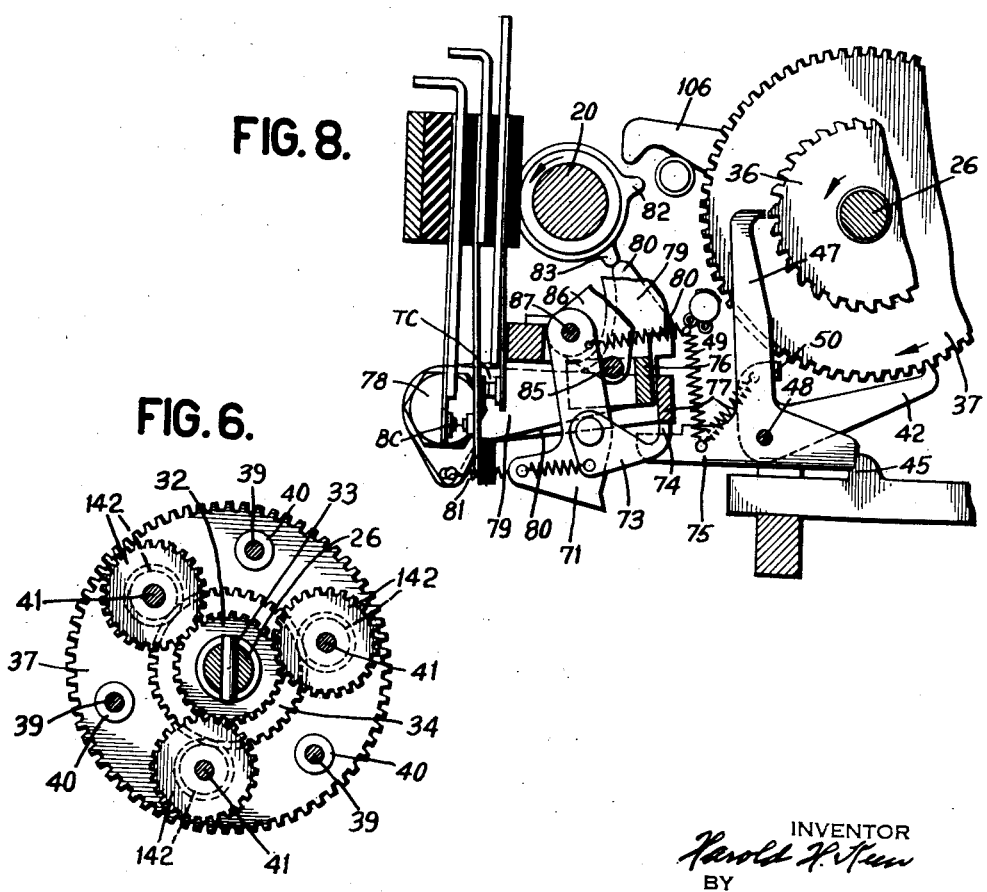

April 3, 1945.   H. H. KEEN   2,372,900
ACTUATOR FOR ACCUMULATING MECHANISMS
Filed Sept. 22, 1939   8 Sheets-Sheet 6

INVENTOR
Harold H. Keen
BY
ATTORNEY

April 3, 1945.  H. H. KEEN  2,372,900
ACTUATOR FOR ACCUMULATING MECHANISMS
Filed Sept. 22, 1939   8 Sheets-Sheet 7

INVENTOR
Harold H. Keen
BY
ATTORNEY

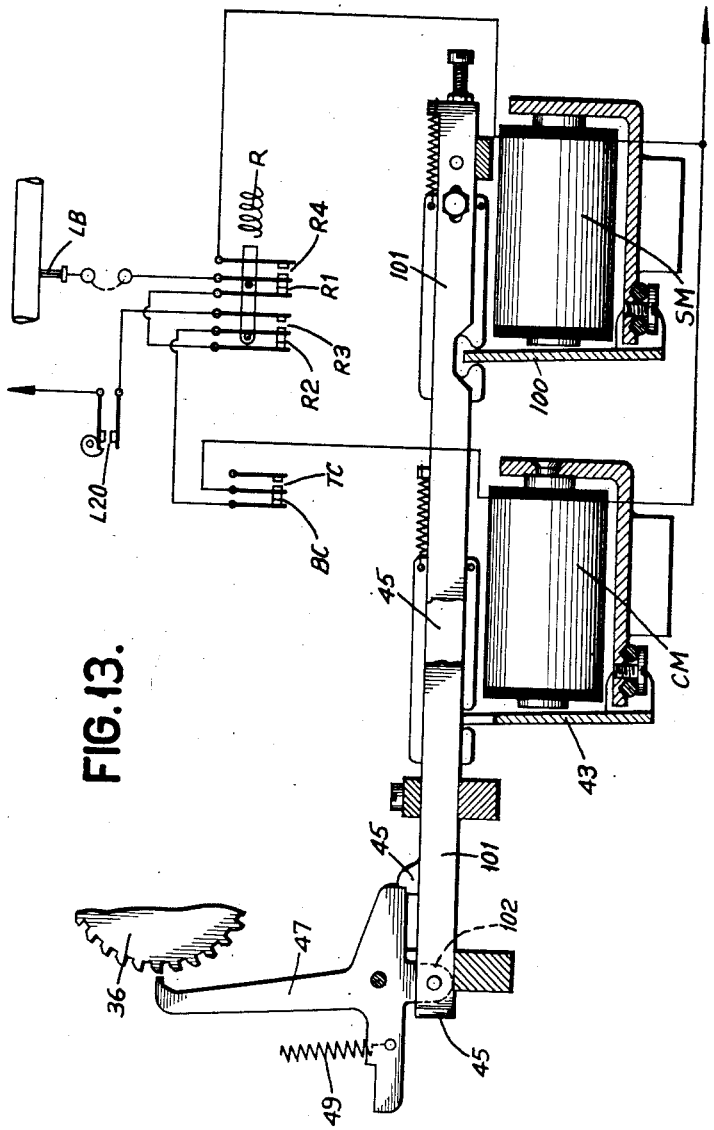

Patented Apr. 3, 1945

2,372,900

UNITED STATES PATENT OFFICE 2,372,900

ACTUATOR FOR ACCUMULATING MECHANISMS

Harold Hall Keen, Letchworth, England, assignor to International Business Machines Corporation, New York, N. Y., a corporation of New York Application September 22, 1939, Serial No. 296,100
In Great Britain September 30, 1938

7 Claims. (Cl. 235—133)

This invention relates to accumulators of the kind comprising a rotatable driving member, a number of accumulator wheels, means for coupling each accumulator wheel to the driving member for a number of steps of movement of the latter equal to a digit to be added by that wheel, and carry mechanism for causing each wheel to turn an extra step when a carry is to be made to it. The present practice is for the driving member to rotate continuously and for each wheel to be coupled to the driving member at a variable point in the cycle of the accumulator and all the wheels to be uncoupled simultaneously, the point at which a wheel is coupled to the driving member being such that it will have turned a number of steps equal to the digit to be added when it is uncoupled. It has also been proposed to couple the wheels to the driving member simultaneously and to uncouple each wheel as soon as it has turned a number of steps equal to the digit to be added. It has also been proposed to effect the carrying operations by coupling all the wheels to which carries are to be made to the driving member simultaneously and then uncoupling them after they have turned one step.

According to the present invention an accumulator comprises a driving member, means for rotating the driving member through a plurality of steps, bringing it to rest, rotating it through a single step and again bringing it to rest, all during each cycle of the accumulator, a number of accumulator wheels, means for coupling each accumulator wheel to the driving member for a number of steps of movement of the latter equal to a digit to be added by that wheel, and a separate carry device associated with each accumulator wheel except the lowest, each of which devices is controlled by the accumulator wheels for lower denominations and arranged when a carry is to be made to its associated wheel, to cause its wheel to be, or to remain, coupled to the driving member during the first rest period of the latter and to be uncoupled therefrom during the second rest period.

The accumulator according to this invention has the advantage over known accumulators in that the simultaneous uncoupling of the accumulator wheels from the driving member at the end of the adding operations of the wheels, and the coupling at the beginning and the uncoupling at the end of the carrying operations, take place when the wheels and the driving member are at rest so that the wear of the parts is reduced and the reliability of the accumulator is increased.

Preferably, the adding operations are performed by coupling each wheel to the driving member at a variable point in the cycle such that the driving member has still to turn a number of steps equal to the digit to be added by that wheel before it comes to rest for the first time in that cycle. There is provided uncoupling means operable to uncouple each wheel from the driving member in either rest period of the driving member and each carry device is arranged to cause the uncoupling means to uncouple its wheel from the driving member during the first rest period of that member when no carry is to be made to its wheel and during the second rest period of the driving member when a carry is to be made to its wheel.

This arrangement has the advantage that a wheel which has a turn to add is not uncoupled from the driving member and then recoupled thereto if it has to receive a carry but remains coupled to the driving member until it has added the carried unit. The number of coupling and uncoupling operations required is thus substantially reduced.

Preferably, each carry device is arranged to cause, when a carry is made to its wheel, its wheel to be coupled to the driving member if it has not been required to add a digit during the cycle and is not therefore already coupled to the driving member. With this arrangement the wheels which are neither required to add nor to receive a carry in a cycle are not coupled to the driving member in that cycle so that unnecessary actuations of the parts are avoided.

The accumulator may be used to subtract by the addition of the nines complement in the well known manner. When so used it is necessary to enter the so-called "fugitive-unit" and a carry device may be provided for the lowest wheel so that the fugitive-unit may be entered by means of this device in known manner.

An accumulator in accordance with the present invention will now be described, by way of example only, with reference to the accompanying drawings in which:

Fig. 6 is a partial section on the line 6—6 of Fig. 3.

Figs. 7, 8 and 9 show certain parts in successive positions.

Fig. 10 is a section on the line 10—10 of Fig. 9.

Fig. 13 shows diagrammatically certain parts that may be added to cause the accumulator to subtract.

Figure 1:
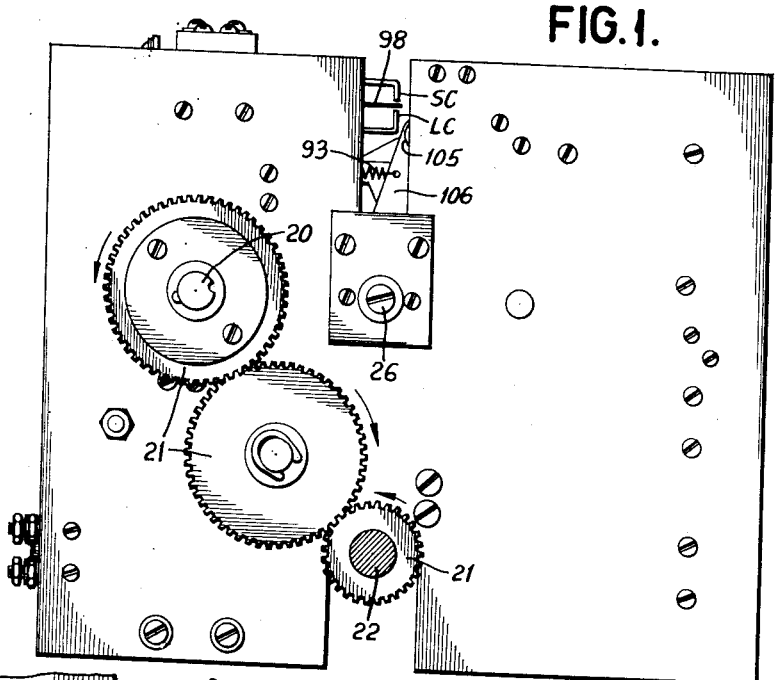
Fig. 1 is an end elevation of one end of the accumulator.
Figure 2:
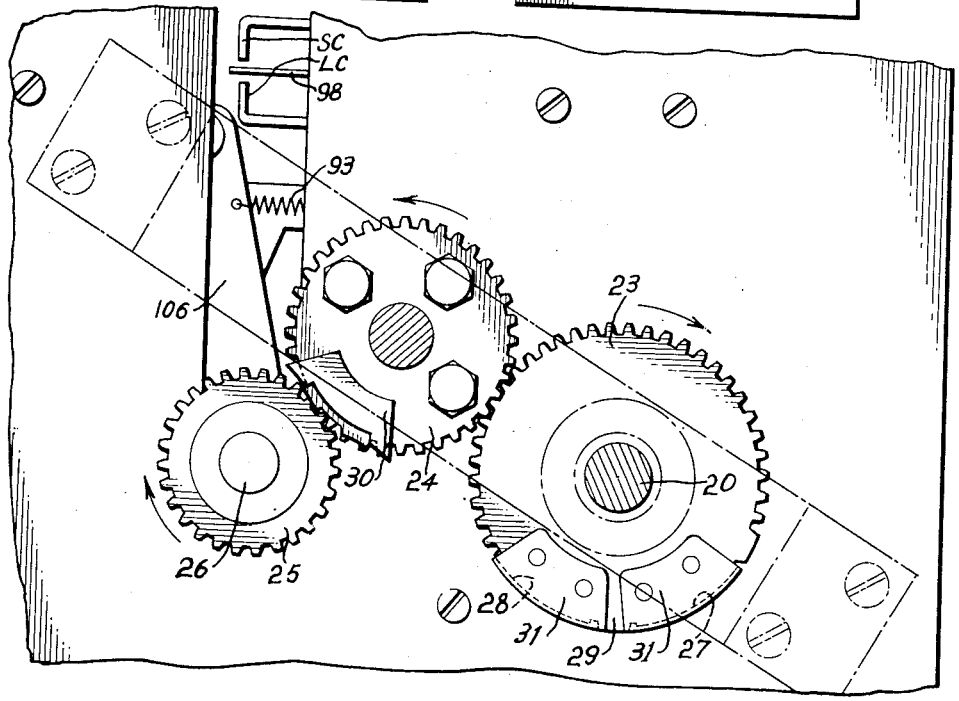
Fig. 2 is an elevation of the other end of the accumulator.
Figure 12:
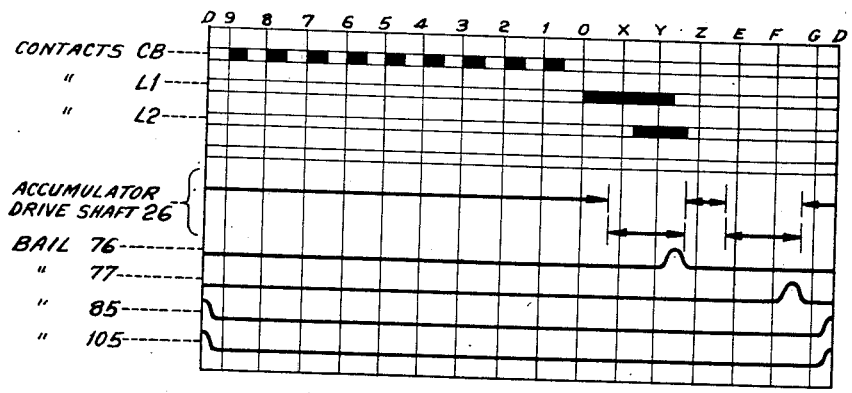
Fig. 12 is a timing diagram for the accumulator.

The accumulator operates on a sixteen point cycle and the points in the cycle are designated 9, 8, 7, 6, 5, 4, 3, 2, 1, 0, X, Y, Z, E, F and G (Fig. 12). The accumulator comprises a cam shaft 20 (Fig. 1) which is driven through suitable gearing 21 from a main shaft 22 so that the cam shaft 20 rotates continuously so long as the accumulator is operating. A mutilated gear wheel 23 (Fig. 2) is secured on one end of the cam shaft 20 and meshes with an idler gear wheel 24 which, in turn, meshes with a gear wheel 25 secured to an accumulator drive shaft 26. The mutilated gear wheel 23 has two gaps 27 and 28 in its teeth so disposed that it begins to drive the idler wheel 24 just before G in the cycle and drives it until just before X in the next cycle. The idler wheel 24 then remains stationary until just before Z in the cycle after which the mutilated wheel 23 drives it by means of a thick tooth 29 until just before E in the cycle. The idler wheel 24 again comes to rest and is stationary from just before E until just before G. The idler wheel 24 and the mutilated wheel 23 carry cooperating lock plates 30 and 31 which lock the idler wheel 24 against movement during the two intervals in each cycle when it is not driven. The gear ratios between the mutilated wheel 23 and the idler wheel 24 and between the latter and the wheel 25 on the accumulator drive shaft 26 are so chosen that the accumulator drive shaft 26 is driven through twelve tenths of a revolution during one revolution of the cam shaft 20 which turns through one revolution in each cycle. Each tenth of a revolution of the accumulator drive shaft 26 will be referred to as a step of movement thereof. The accumulator drive shaft 26 thus turns through eleven steps during eleven sixteenths of each cycle, remains at rest during two sixteenths of the cycle, turns through one step and remains at rest for the remaining two sixteenths of the cycle, as shown in Fig. 12.

The parts comprising each denomination of the accumulator are the same so that it will be sufficient to describe one denomination. Each denomination comprises a sun wheel 32 (Fig. 6) secured on the accumulator drive shaft 26 by a pin 33 and a second sun wheel 34 (Fig. 5) rotatably mounted on the shaft 26 by means of a hub 35 which has a ratchet-toothed wheel 36 (Fig. 4) secured to it by rivets. A planet carrier is constituted by a gear wheel 37 (Fig. 4) rotatable on the hub 35 between the sun wheel 34 and the ratchet-toothed wheel 36 and a cam disc 38 (Fig. 5) rotatable on the shaft 26. The gear wheel 37 and the cam disc 38 are secured together by pin 39 carrying distance washers 40 and pins 41 on which are mounted compound planet pinions 142 each of which meshes with both sun wheels. The gear ratios are so chosen that the planet carrier 37—38 will rotate at half the speed of the accumulator drive shaft 26 and in the reverse direction if the sun wheel 34 is held stationary. The planet carrier 37—38 constitutes an accumulator wheel and is normally held stationary by a holding pawl 42 (Fig. 4) which engages between the teeth of the gear wheel 37 forming part of it. The wheel 37 has eighty teeth, four teeth for each unit entry, so that it can be held in any of twenty positions. The ratchet-toothed wheel 36 (Fig. 8) can be held, to cause the planet carrier 37—38 to turn to add, by energizing an accumulator magnet CM. The magnet CM attracts its armature 43 (Fig. 4) which engages a notch in a slide 44 to move the slide to the right. This moves a step 45 on the slide from under the tail 46 of a stop pawl 47 which is thus released and rocked about a rod 48 by a spring 49 to engage between the teeth of the ratchet-toothed wheel 36 (as shown in Fig. 7) and bring it and the sun wheel 34 to rest. The stop pawl 47 engages a tail 50 of the holding pawl 42, as it rocks, and rocks the latter about the rod 48 from the gear wheel 37 forming part of the planet carrier 37—38 so that the latter can be driven.

Figure 11:
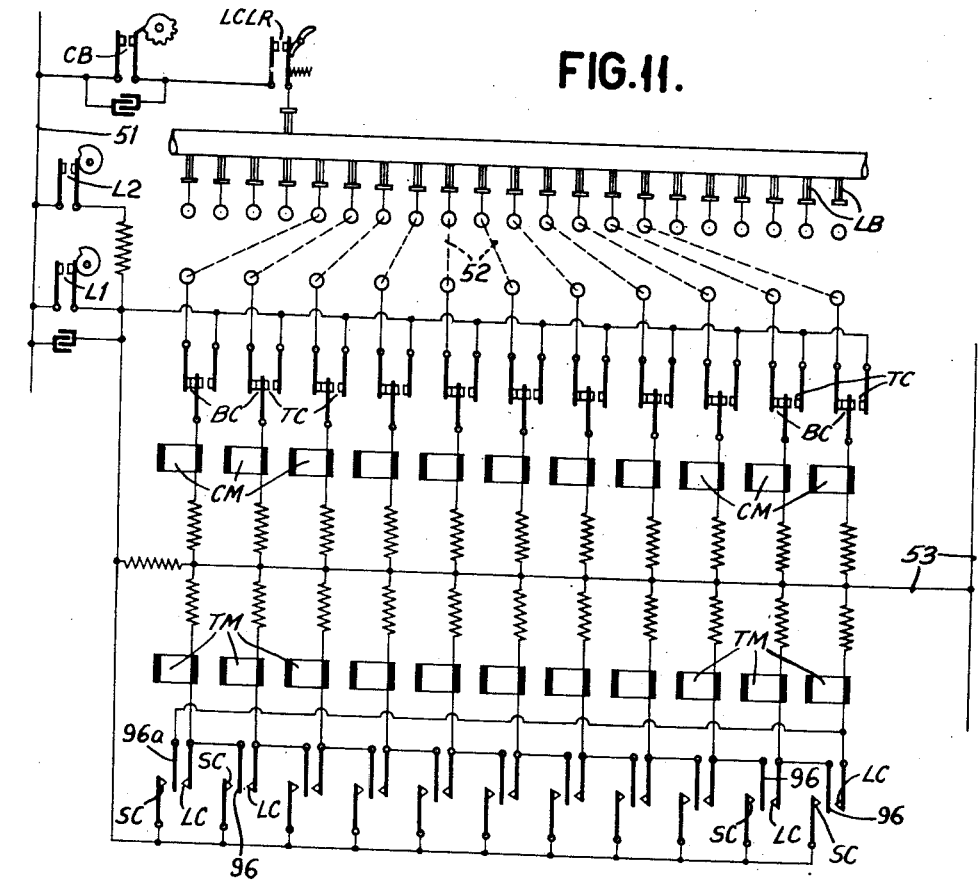
Fig. 11 is a circuit diagram for the accumulator.

The planet carrier 37—38 adds unity for each step of movement which is one twentieth of a revolution and occupies one sixteenth of a cycle. The earlier in a cycle the magnet CM is energized, the more steps does the planet carrier 37—38 turn through before the accumulator drive shaft 26 comes to rest for the first time in that cycle and the higher is the digit it adds. Thus if a circuit is completed to the magnet CM at the 9 point in a cycle, the ratchet-toothed wheel 36 will be brought to rest just before the 8 point and the planet carrier 37—38 will turn 9 steps before the accumulator drive shaft 26 comes to rest just before the X point in the cycle. The delay in stopping the wheel 36 is necessary to allow for the magnetic and mechanical inertia of the parts and the accumulator drive shaft 26 is arranged to come to rest just before the X point instead of at the 0 point in consequence of this delay. In the same way any other digit can be added by completing the circuit of the magnet CM at the point in the cycle designated by that digit. The accumulator can be caused to add an amount recorded in a perforated record card by connecting each accumulator control magnet CM through normally closed brush contacts BC (Fig. 11) to a separate brush LB and feeding the card past the brushes so that each brush completes a circuit, when it encounters a hole in the card, from a main line 51 through contacts CB and card lever contacts LCLR, the brushes LB, a plug connection 52, the contacts BC, the magnet CM and a second supply line 53. This method of entering an amount from a card into an accumulator is well known and need not be described further.

Each gear wheel 37 (Fig. 4), which forms part of the planet carrier 37—38 drives, through an idler wheel 54, a readout gear wheel 55 with a one-to-one gear ratio. Each readout carries a pair of plungers 56 electrically connected and pressed apart by a spring 57. These plungers are diametrically opposed and wipe over a readout commutator 58 having a semi-circular common segment 59 and ten digital segments 60 allocated each to a different digit. When the planet carrier 37—38 is in position to represent a given digit, one of the brushes 56 will engage the digital segment 60 allocated to that digit and connect it electrically to the common segment 59 which is engaged by the other brush 56. The readout commutators are used to control the recording of a total in the accumulator or the entry of the total into an accumulator or register in a well-known manner used in tabulating machines.

Figure 3:
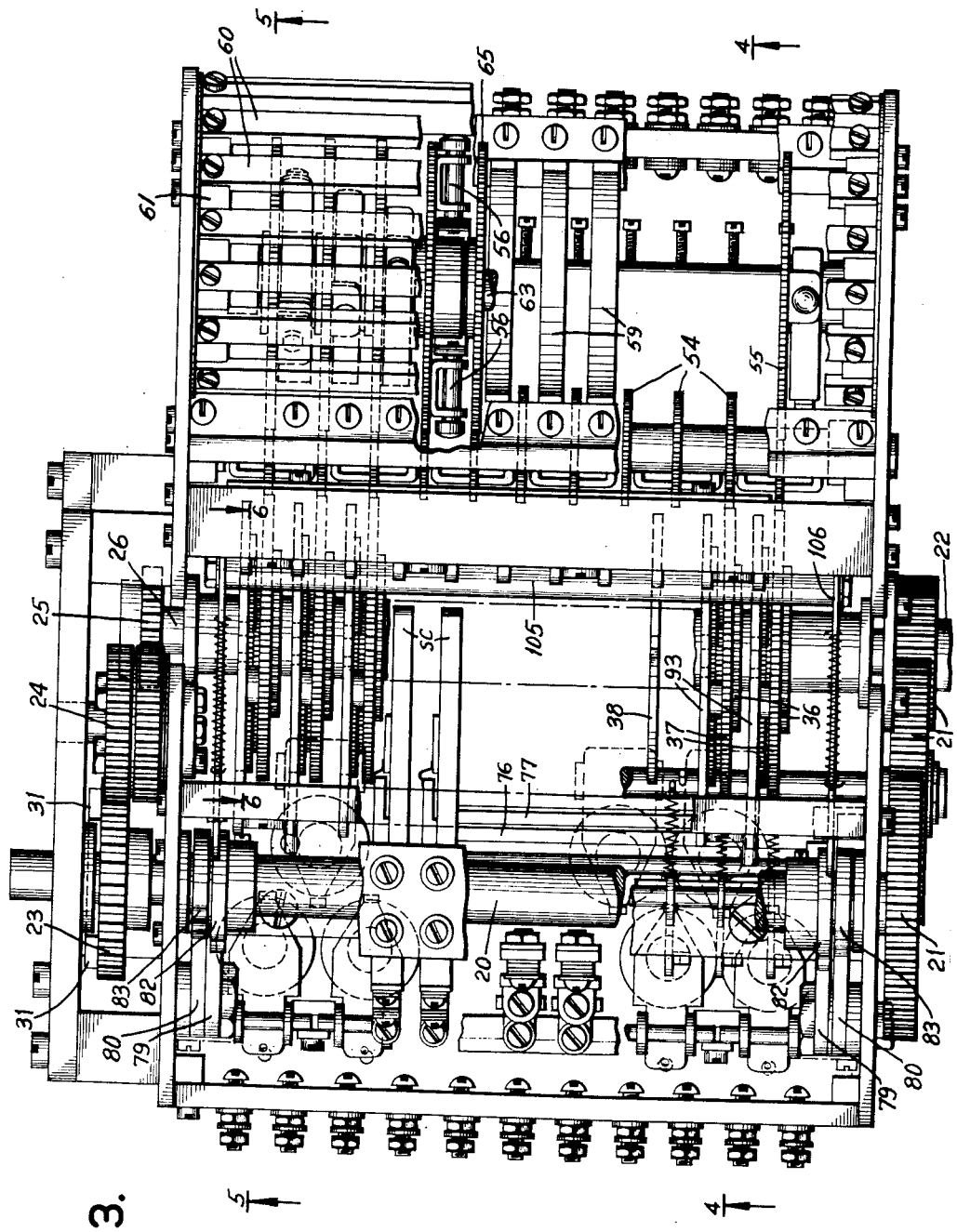
Fig. 3 is a plan of the accumulator, parts being broken away to show the underlying mechanism.

The segments 60 are constituted by ten bars as shown in Fig. 3, each bar being common to all the commutators and mounted on insulating supports 61. There is a separate segment 59 for each commutator and they are carried by insulating bars 62. The wheels 55 are made of insulating material and rotate on a fixed shaft 63.

By the time the accumulator shaft 26 comes to rest for the first time in the cycle, the various denominations of the accumulator will have added the digits entered by the timed energizations of the respective magnets CM. The necessary carries from one denomination to the next must now be effected and this is done in the following manner. If a denomination is not to receive a carry, its planet carrier 37—38 is uncoupled from the accumulator drive shaft 26 during the first rest period of the latter by rocking its stop pawl 47 away from the related ratchet-toothed wheel 36 and rocking its holding pawl 42 into engagement with the wheel 37. This planet carrier 37—38 will not be driven by the accumulator drive shaft 26 when the latter turns one step between its rest periods. If a denomination is to receive a carry, its planet carrier 37—38 is uncoupled from the accumulator drive shaft 26 during the second rest period of the latter so that it is driven an extra step by the accumulator drive shaft between the two rest periods. The uncoupling of each planet-carrier 37—38 is controlled by a carry device and as these devices are identical only one will be described.

Figure 4:
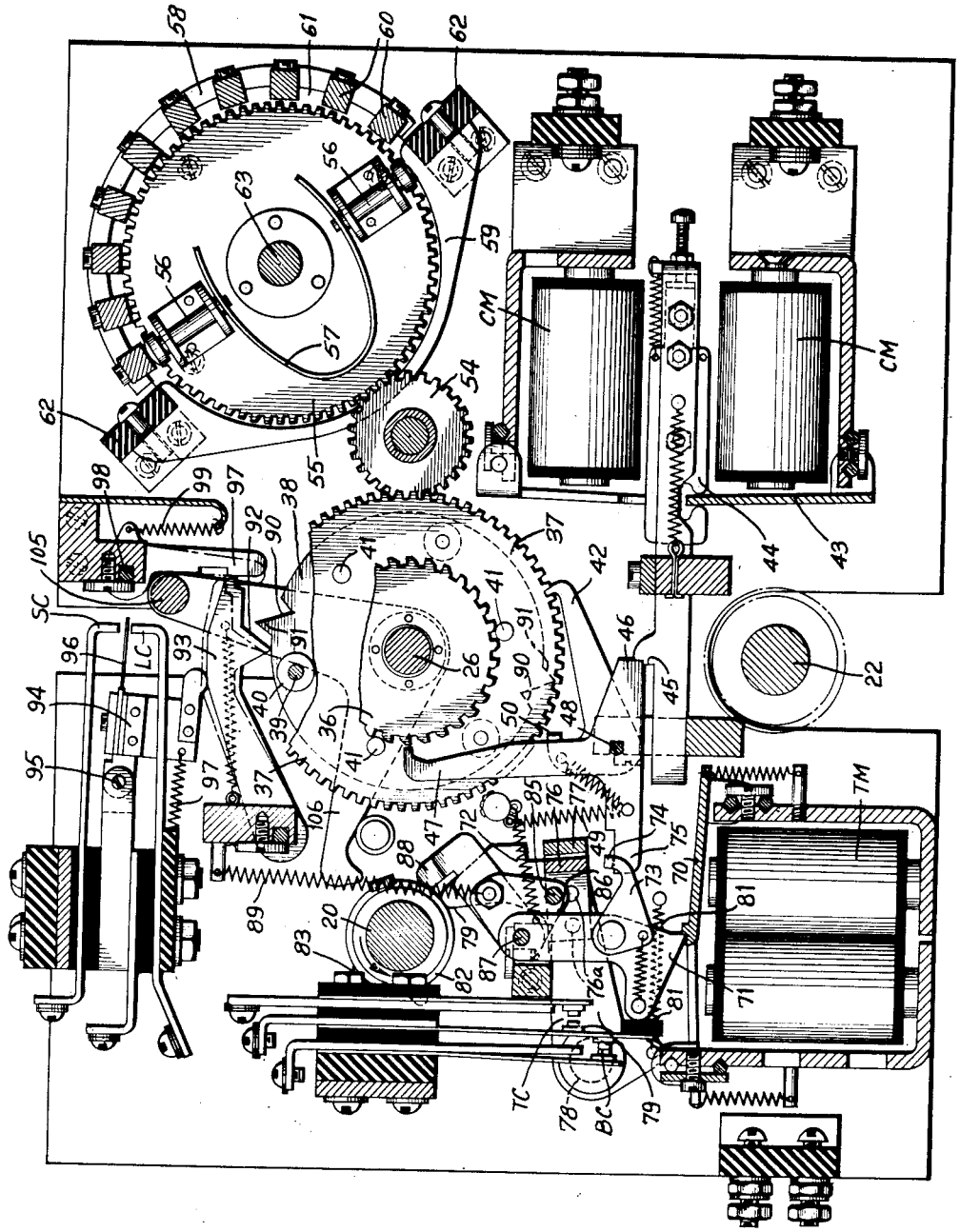
Fig. 4 is a vertical section through the accumulator on the line 4—4 of Fig. 3.
Figures 9, 10:
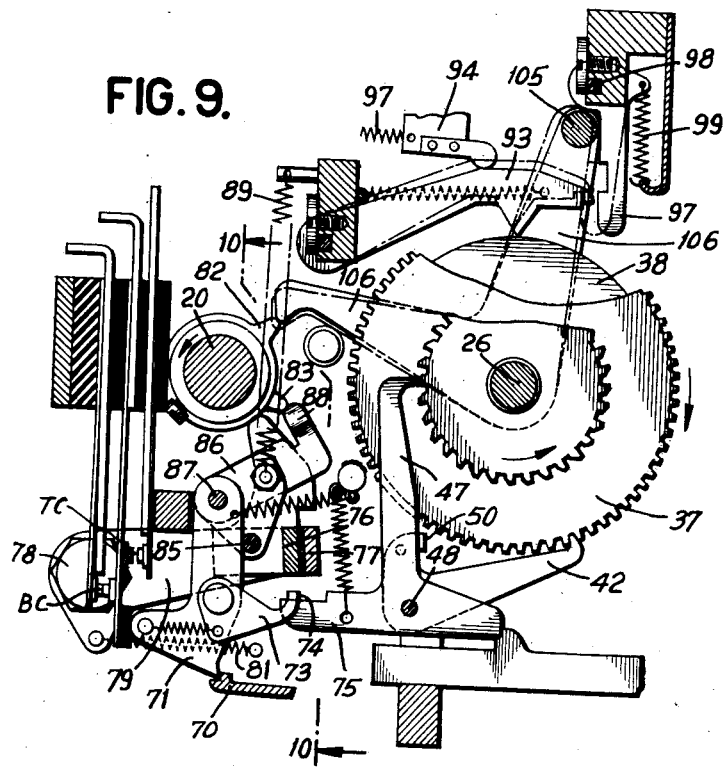

Each carry device comprises a transfer or carry magnet TM whose armature 70 holds a carry lever 71 in a normal position (as shown in Fig. 4) against the pressure of a spring 72. The carry lever 71 also holds closed the brush contacts BC connected to the accumulator control magnet CM for the same denomination when the lever is in its normal position. The carry lever 71 supports an interposer in the form of a lever 73 pivoted on it and having its free end 74 bent over to overlie an arm 75 projecting from the related stop pawl 47. Two uncoupling bails 76 and 77 are mounted at each end to rock about a pivot 78 on arms 79 and 80 respectively (see also Fig. 10). In the preferred construction the outside bail consists of a cross member designated 77 integral with two side arms 80 (see Fig. 3). The inside bail consists of a cross member designated 76 having integral portions fixed to the related arms 79 by pins 76a (see Figs. 4 and 5), thus forming a bail. The arms 79 and 80 are held by springs 81 against cams 82 and 83 respectively secured on the cam shaft 20. As can be seen from Fig. 3 there is a pair of cams 82 and 83 at each end of the cam shaft. The cams 82 are arranged to rock the arms 79 and depress the first uncoupling bail 76 at the end of the first rest period of the shaft 26 while the cams 83 depress the second uncoupling bail 77 at the end of the second rest period (see Fig. 12). When the carry lever 71 is in its normal position (shown in Fig. 4), the end 74 of the interposer lies below the first uncoupling bail 76 so that the first bail 76 will rock the interposer 73 near the end of the first rest period of the accumulator drive shaft 26 and the interposer 73 will, in turn, rock the stop pawl 47, by means of its arm 75, away from the ratchet-toothed wheel 36. The holding pawl 42 then rocks to hold the planet carrier 37—38 stationary while the accumulator drive shaft 26 turns its additional step.

When the carry magnet TM is energized, it attracts its armature 70 which releases the carry lever 71 so that this lever can be moved to a carry position by the spring 72. The brush contacts BC (see Fig. 11) open to disconnect the accumulator control magnet CM from the related brush LB and another pair of contacts TC close to connect the accumulator control magnet CM to cam contacts L1 and L2 one or the other of which is closed from the 0 point and to between the Y and Z points in the cycle. This ensures that the magnet CM is energized and the planet carrier 37—38 coupled to the accumulator drive shaft 26 should this denomination not have added a significant digit during the cycle. It is, thus, unnecessary to energize the accumulator control magnets for those denominations into which nothing is to be entered at the 0 point in the cycle and unnecessary operation of the parts of a denomination, which is required neither to add nor to receive a carry, is avoided.

When the carry lever 71 moves to its carry position shown in Figs. 7 and 8, it moves the interposer 73 from under the first uncoupling bail 76 to under the second uncoupling bail 77. The clearance between the bails 76 and 77 and the arm 75 of the stop pawl 47 is sufficient to allow each bail to rock without moving the arm if the interposer 73 is not between that bail and the arm. Thus the first bail 76 will rock (as shown in Fig. 7) in the first rest period of the accumulator drive shaft 26 without rocking the stop pawl 47 to uncouple the planet carrier 37—38 from the accumulator drive shaft 26 if the carry lever 71 is in the carry position. The second bail will, however, rock the interposer 73 which rocks the stop pawl 47 (as shown in Fig. 8) to uncouple the planet carrier 37—38 from the accumulator drive shaft 26 at the end of the second rest period of the accumulator shaft. The carried unit will thus be added by the planet carrier 37—38 during the extra step of movement of the accumulator drive shaft 26.

The carry levers 71 are restored by a restoring bail 85 (see Figs. 4 and 9) and relatched by the armatures 70 of the accumulator control magnets TM. The restoring bail 85 is carried by arms 86 pivoted on a rod 87 on which the levers 71 are also pivoted and each having a nose 88 bent over to be engaged by the cam 83 (see Fig. 10). The cams 83 rock the bail 85, against the action of springs 89, between the G point of one cycle and the 9 point of the next cycle.

Figure 5:
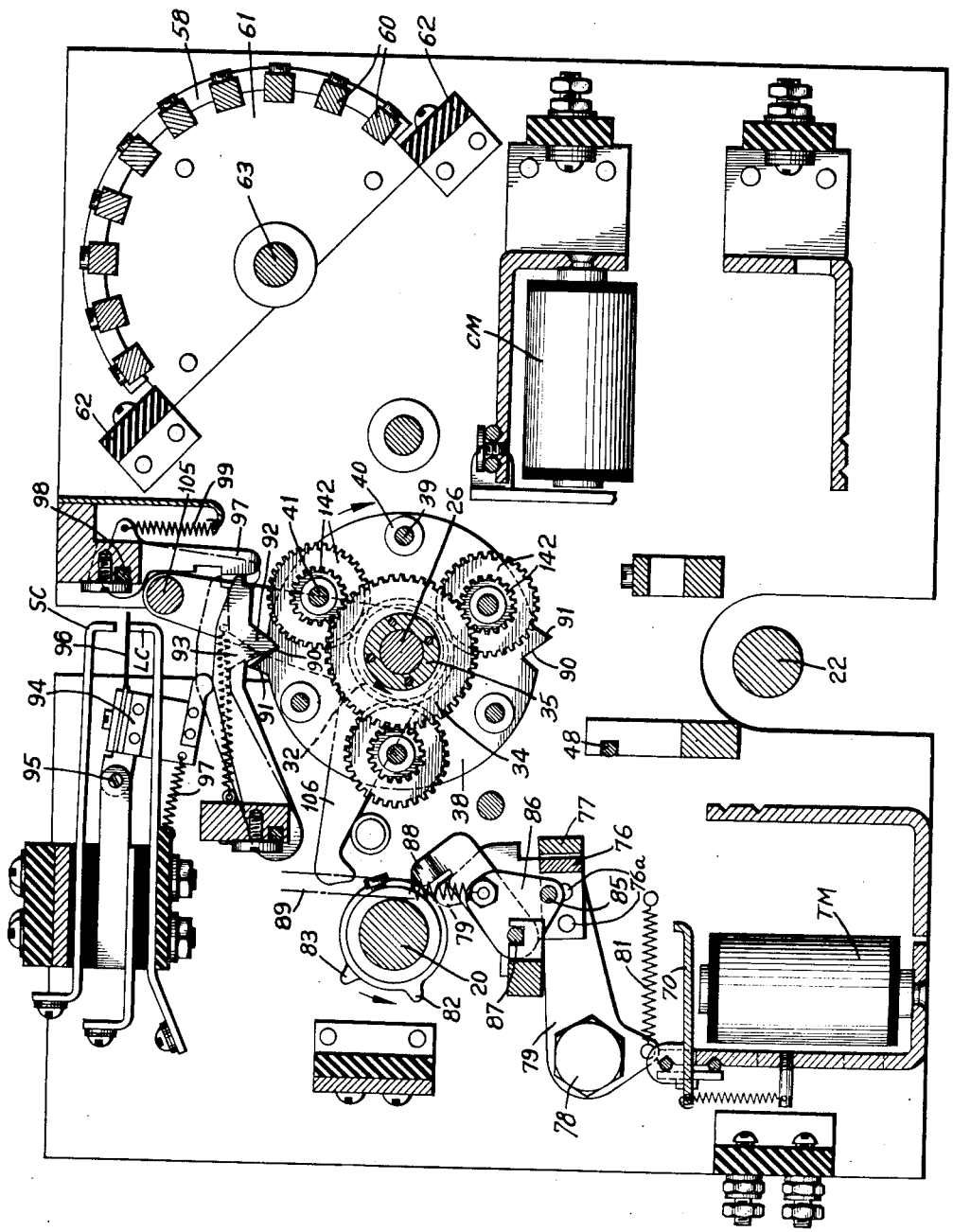
Fig. 5 is a vertical section through the accumulator on the line 5—5 of Fig. 3.

The carry magnets TM are energized in the following manner. The cam disc 38 has diametrically opposed notches 90 and a projection 91 near each notch (see Figs. 4 and 5). The cam disc turns through ten steps to add ten in half a revolution and thus has two zero and two nine positions. When the disc 38 is in either of its nine positions, one or other of the notches 90 is opposite the nose 92 of a carry contact lever 93. A brush holder 94 is pivoted at 95 and carries a brush 96. A spring 97 holds the brush holder against the upper surface of the carry contact lever 93 and presses the nose 92 of the latter against the periphery of the cam. Thus, when the cam disc is in its nine position, the nose 92 will enter the notch as shown in Figure 5 and the lever 93 and brush holder 94 will rock down so that the brush 96 engages a long carry contact LC. When the disc turns from nine to zero, one of the projections 91 rocks the carry contact lever 93 into position to be engaged and held by a latch 97 which is pivoted at 98 and biased clockwise by a spring 99. In this position the brush holder 94 is rocked up and the brush 96 engages a short carry contact SC. Thus, at the time when the accumulator drive shaft 26 comes to rest for the first time in a cycle, the short carry contact will be engaged by the brush 96 if the planet carrier 37—38 has turned from nine to zero in the cycle and the long carry contact will be engaged by the brush if the planet carrier 37—38 comes to rest registering nine. Under any other conditions the carry contact lever 93 will be held by the periphery of the disc in such position that the brush 96 engages neither of the contacts SC and LC as shown in Figure 4.

Each brush 96 is connected to the carry magnet TM for the next higher denomination so that, if a brush 96 engages the related contact SC the closure of contacts L1 just prior to the first rest period will cause the magnet TM for the next denomination to be energized. Each long carry contact LC is connected to the carry magnet TM for the same denomination so that, if it is engaged by its brush 96, it connects the carry magnet TM for its denomination and that for the next higher denomination in parallel. Thus, if the units planet carrier turns from nine to zero during an adding operation, the units short carry contact SC will be engaged by the units brush 96 at the X point in the cycle and a circuit will be completed through them to energize the tens carry magnet TM. If the tens planet carrier registers nine at the X point in the cycle, the tens long carry contact LC will be engaged by the tens brush 96 and the hundreds carry magnet TM will be energized also.

The functions of contacts L1 and L2 although not vital to the general scheme of actual electrical refinements, are included to meet extreme and preferred conditions.

The condition of a short transfer can be set up by any of the SC96 contacts at any time during the adding portion of the cycle. Thus, if a wheel already holds a 9 and an impulse is received at 9 time in the cycle to add a further value of 9, the associated contacts SC96 will close aproximately at 8 time and energize the magnet TM of the next higher denomination to effect the necessary transfer.

If, on the other hand, an impulse is received at 1 time to add unity to an already existing 9, then the SC96 contact will close around the zero time to energize the TM magnet of the next higher denomination. These extreme cases introduce an inconsistent and variable electrical time duration of the magnets TM. It is, therefore, preferable to stabilize this condition by provisions of cam contacts L1, and delay the closing of the circuit until the latest possible time, that is, zero, as is indicated in the timing diagram of Fig. 12.

Now, with regard to the contacts L1 and L2, it is stated that on occasions, the transfer may extend over several of the wheels of succeedingly higher denomination and therefore a plurality of magnets TM will be energized. Thus, on a successive transfer, the current for energizing the magnets TM becomes too large for contact L1 to break effectively. Therefore, contacts L2 and a series resistance is introduced to break the current in two places. On the opening of cam contacts L1, cam contacts L2 are closed and the series resistance reduces the current value which is broken to one-half, and the final break of this current will be effected by the subsequent opening of cam contacts L2.

The latches 97 for the carry contact levers 93 are restored by a bail 105 (see Fig. 9) which is carried by bell crank levers 106 pivoted on the shaft 26 and operated by the cams 82 on the cam shaft between the G and the 9 points of the cycle.

When the accumulator is to subtract by adding the nines complement of the number to be subtracted in the well known manner, the brush 96a for the highest denomination may be connected to the carry magnet TM for the units denomination, so that, when the highest denomination carries, the carry will be added by the units denomination to take care of the fugitive unit which must be added when subtracting by this method. If the accumulator has only to add, the carry contacts, lever and latch for the highest denomination and the carry magnet and carry lever for the units denomination may be omitted and the units interposer pivoted on a fixed part.

The accumulator may be modified, as shown diagrammatically in Figure 13, to subtract numbers recorded on the cards by providing each denomination with a subtraction magnet SM whose armature 100 operates a slide 101 which is connected to an arm 102 of the related stop pawl 47 so that, when the pawl 47 rocks to engage the ratchet-toothed wheel 36, the slide 101 is moved to the left and the armature 100 is moved away from the core of the magnet SM. The adding operation is as described before except that the adding circuit includes relay contacts R1 and R2. When a negative amount is present in a card, a relay R is energized, in a known manner, and opens the contacts R1 and R2 to disconnect the accumulator magnets CM from the brushes and closes contacts R3 to connect them in series with cam contacts L20 which close at the 9 point in the cycle to energize the accumulator magnets CM so that all the planet carriers 37—38 are coupled to the accumulator drive shaft and commence to turn. The relay R also closes contacts R4 to connect the subtraction magnets SM to the brushes LB so that these magnets are energized each when the related brush encounters a hole in a card. Each subtraction magnet SM, when energized, attracts its armature 100 and rocks the related stop pawl 47 away from its ratchet-toothed wheel 36 so that the planet carrier 37—38 is brought to rest after adding the complement of the digit recorded on the card. As this method of subtracting in an accumulator is well known, it need not be described in greater detail. The carrying operations during subtraction are the same as during addition.

Having now particularly described and ascertained the nature of my said invention and in what manner the same is to be performed, I declare that what I claim is:

1. In an accumulator, the combination of at least two accumulator wheels of higher and lower denominational orders, a driving member for said accumulator wheels which is rotated through a plurality of steps, then brought to rest for a period, then rotated through a single step, and again brought to rest for another period, all during each operating cycle of the accumulator, means for coupling each accumulator wheel to its driving member for a number of steps equal to a digit to be added by that wheel, mechanical knockoff means for uncoupling said coupling means for each order during the first rest period of said driving member, units carry control means controlled by the accumulator wheel of the lower denominational order upon its passage through a predetermined position for causing said mechanical knockoff uncoupling means to be ineffective to uncouple the coupling means of higher order to thereby retain said coupling means of higher denominational order effective during the rotation of the driving member a single step to rotate the higher order wheel one step, supplemental mechanical knockoff means for uncoupling said coupling means of higher order during the second rest period of said driving member after said coupling means is effective for rotating the higher order wheel one step, and means for sequentially operating said mechanical knockoff means, each of said knockoff means being operated during the related rest period of the driving member.

2. In an accumulator, the combination of a driving member rotated through a plurality of steps, then brought to rest for a period, then rotated through a single step for a units carry, and again brought to rest for another period, all during each operating cycle of the accumulator, a pair of accumulator wheels of lower and higher denominational order, means for coupling each accumulator wheel to the driving member at a point in the cycle such that the driving member has still to turn a number of steps equal to a digit to be added by that wheel before it comes to rest for the first rest period in that cycle, mechanical knockoff uncoupling means common to the coupling means for all orders including means to effect its operation in the first rest period to normally disable the coupling means for each order to uncouple each accumulator wheel from the driving member in the first rest period, supplemental mechanical knockoff means common to the coupling means for all orders higher than the units order including means to effect its operation in the second rest period to disable the coupling means of higher order during the second rest period if the coupling means of higher order is retained effective for a carry operation, and a carry mechanism operatively associated with the accumulator wheel of higher denominational order and including means controlled by the accumulator wheel of lower denominational order effective upon said lower order wheel passing through zero to cause said first-mentioned mechanical knockoff means to be ineffective in the higher order during the first rest period to retain the higher order wheel coupled to said member to effect a units carry by said driving member during its rotation of one step.

3. In an accumulator, the combination of at least two accumulator wheels of higher and lower denominational orders, a driving member for said accumulator wheels rotated through a plurality of steps, brought to rest for a period, then rotated through a single step and again brought to rest for another period all during each operating cycle of the accumulator, means for coupling each accumulator wheel to its driving member for a number of steps equal to a digit to be added by that wheel, means for uncoupling said coupling means for each order during the first rest period of said driving member, units carry control means controlled by the accumulator wheel of the lower denominational order upon its passage through a predetermined digit position for causing said uncoupling means to be ineffective to uncouple the coupling means of higher order to thereby retain said coupling means of higher denominational order effective during the rotation of the driving member a single step to rotate the higher order wheel one step, means for uncoupling said coupling means of higher order during the second rest period of said driving member after said coupling means is effective for rotating the higher order wheel one step, and supplemental means controlled by the units carry control means when said wheel of lower order passes through the predetermined digit position for causing the coupling means for the accumulator wheel of higher order to be effective to couple the last named wheel with said driving member when said wheel has not been rotated by said member to add a digit.

4. In an accumulator, the combination of at least two wheels of lower and higher denominational order, a driving member for said wheels rotated through a plurality of steps, brought to rest for a period, then rotated through a single step, and again brought to rest for another period, all within each operating cycle of the accumulator, means for coupling each wheel to said driving member for a plurality of steps of its rotation equal to the digit to be added by that wheel, a plurality of bails, sequentially operable means for operating one of said bails the first period the member is at rest, and the other bail the second period the member is at rest, an interposer for each order and normally positioned to enable the bail first operated through said interposer to uncouple the wheels from said driving member when the latter has been rotated a plurality of steps, and a carry mechanism including means controlled by the wheel of lower order for positioning the interposer related to the higher order wheel to render the bail first operated ineffective to thus enable the wheel of higher order to be retained coupled to the driving member during its rotation of a single step, said interposer then being positioned to render the other bail effective through said interposer to uncouple the higher order wheel from the driving member during the second rest period of said member.

5. In an accumulator for a calculating machine, a cyclically operated member rotated through a plurality of steps, brought to rest for a time, and then operated a single step, at least two accumulator elements of higher and lower denominational orders, respective clutches for connecting said elements with said member during its rotation of a plurality of steps and said single step, means for disconnecting said clutches during the time said member is at rest, carry mechanism including means controlled by an element of lower order effective during its passage through a certain digit position for rendering said last named means ineffective to disconnect the clutch of the higher order element from said member to enable the element to be retained clutched to the member during the rotation of said member for a single step to thereby effect a carry of a unit to the element without effecting its disconnection from the member, and means controlled by said carry mechanism for rendering the clutch of the accumulator element of higher order effective for connecting said element to said member during the time of rest of the latter, when said element has not been clutched to the member during its rotation for said plurality of steps, for causing said member in its rotation of a single step to effect a units carry.

6. In a calculating machine, a driving member rotated through a plurality of steps, then brought to rest for a period, then rotated a single step, and again brought to rest for a second period, at least two accumulating orders of higher and lower denominational order, each order comprising a planet carrier, an epicyclic gear for driving th planet carrier for each order consisting of, a driving sun-gear constantly connected to said driving member, a second sun-gear having the same axial mounting as the first named sun-gear, and a compound planet pinion rotatably carried by said planet carrier and intergearing the two sun-gears, a stop device for each order for normally locking the related planet carrier and operable to unlock said planet carrier and to lock said second sun-gear, means for each order for operating said stop device to unlock the related planet carrier and to lock said second sun-gear during the rotation of the member a plurality of steps, or for the single step for the higher order stop device, means for normally operating the stop device for each order during the first rest period, or if a carry is to take place for operating the stop device for a higher order during the second rest period of the driving member, to thereby lock said planet carrier of higher order and unlock the related second sun-gear, and a carry mechanism controlled by the lower order planet carrier upon its passage through zero for preventing the operation of the stop device of higher order during the first rest period to enable said stop device of higher order to be retained in its position for unlocking the planet carrier of higher order and for locking the related second sun-gear, whereby said driving member upon its rotation for a single step will rotate said higher order planet carrier a single step for a units carry.

7. In an accumulator, the combination of at least two accumulator wheels of higher and lower denominational orders, a driving member for said accumulator wheels which is rotated through a plurality of steps for adding operations and then through a single step, all during each operating cycle of the accumulator, means for coupling each accumulator wheel to its driving member for a number of steps equal to a digit to be added by that wheel, mechanical knockoff means common to the coupling means of all orders for uncoupling the latter at the termination of the rotation of said member for the plurality of steps, units carry control means controlled by the accumulator wheel of the lower denominational order upon its passage through a predetermined digit position for causing said mechanical knockoff coupling means to be ineffective to uncouple the coupling means of higher denominational order to thereby retain the coupling means of higher denominational order effective during the rotation of the driving member a single step to rotate the higher order wheel one step, supplemental mechanical knockoff means common to the coupling means for all orders higher than the units order for uncoupling said coupling means of higher order after the rotation of said member for a single step causes, through the coupling means, the rotation of the higher order wheel one step, and means for sequentially operating the first named mechanical knock-off means after the rotation of the driving member for a plurality of steps and the second named mechanical knock-off means after the rotation of the driving member for said single step.

HAROLD HALL KEEN.